(12) United States Patent  
Chung et al.

(10) Patent No.: US 7,986,100 B2
(45) Date of Patent: Jul. 26, 2011

(54) LED STRING

(75) Inventors: Shin-Hong Chung, Taipei Hsien (TW); Jui-Lin Ke, Taipei Hsien (TW); Hui Yin, Shenzhen (CN); Han-Che Wang, Taipei Hsien (TW); Kuan-Hong Hsieh, Taipei Hsien (TW); Zhi-Guo Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 410 days.

(21) Appl. No.: 12/205,924

(22) Filed: Sep. 8, 2008

(65) Prior Publication Data

US 2009/0134810 A1    May 28, 2009

(30) Foreign Application Priority Data

Nov. 23, 2007    (CN) .......................... 2007 1 0124769

(51) Int. Cl.
   *H05B 41/00*    (2006.01)
(52) U.S. Cl. .................... 315/187; 315/185; 315/185 S; 315/185 R; 315/200 A; 315/201; 362/85; 362/86; 362/249.06; 362/249.14; 362/545

(58) Field of Classification Search .................. 315/185, 315/185 S, 187, 200 A, 312–326; 362/85, 362/86, 95, 249.06, 249.14, 231, 545
See application file for complete search history.

(56) References Cited

U.S. PATENT DOCUMENTS

| | | | | |
|---|---|---|---|---|
| 6,062,708 | A * | 5/2000 | Chen | 362/249.14 |
| 7,175,302 | B2 * | 2/2007 | Kazar et al. | 362/231 |
| 2004/0233668 | A1 * | 11/2004 | Telfer et al. | 362/252 |
| 2005/0111231 | A1 * | 5/2005 | Crodian et al. | 362/545 |
| 2007/0177383 | A1 | 8/2007 | Tsai | |
| 2008/0122375 | A1 * | 5/2008 | Yang | 315/185 S |

* cited by examiner

*Primary Examiner* — Douglas W Owens
*Assistant Examiner* — Thai Pham
(74) *Attorney, Agent, or Firm* — Zhigang Ma (57) ABSTRACT

A light-emitting diode (LED) string is provided. The LED string includes a power plug configured for connecting with a power source to power the LED string; one or more LED sockets configured for electrically connecting with the power plug; one or more LEDs configured for being installed on and electrically connecting with the LED sockets; and a control module configured for being electrically connected with any-one of the LED sockets. The control module includes a control circuit, an input terminal and an output terminal, the control circuit electrically connects with one of the LED sockets via the input terminal and the output terminal and controls a current flowing through the LED string to change from a first value to a second value, thereby controlling the LED string to light.

11 Claims, 7 Drawing Sheets

LED STRING

BACKGROUND OF THE INVENTION

1. Field of the Invention

The present invention relates to light-emitting diode string and, particularly, to a light-emitting diode string capable of easily changing a blinking frequency and brightness.

2. Description of Related Art

Light-emitting diode (LED) strings are usually used in rooms or entertainment places for enhancing the festival atmosphere, the blinking frequency and brightness of the conventional LED strings can be controlled by a complex control procedure stored therein. However, it is difficult for a consumer to update the control procedure to change the blinking frequency and brightness of the LED strings. Therefore, a LED string which can blink without a complex control procedure is desirable to be developed.

The United States Patent Application Publication No. 20070177383, entitled "Decorative Lighting String" discloses a decorative lighting string, which includes a connector, a rectifier, an housing, a LED lamp and a PCB circuit board. The PCB circuit board is defined with an IC controlling circuit that is provided for controlling the blinking frequency and brightness of the LED lamp. The LED lamp and the PCB circuit board are both included in the housing. The connector is connected with an ordinary decorative lighting string directly or connected with the direct current via the rectifier for supplying power.

However, the blinking effects of the LED lamp is changed by using different kinds of wafers. Therefore, in order to change the blinking effect of the decorative lighting string, different IC control circuits must be used, which is inconvenient for a user.

Therefore, it is necessary to provide a LED string capable of easily changing its blinking effect.

SUMMARY OF THE INVENTION

A LED string includes a power plug configured for connecting with a power source to power the LED string. One or more LED sockets configured for electrically connecting with the power plug. One or more LEDs are configured for being installed on, and electrically connecting with, the LED sockets. A control module configured for being electrically connected with one of the LED sockets. The control module includes a control circuit, an input terminal and an output terminal, the control circuit electrically connects with one of the LED sockets via the input terminal and the output terminal and controls a current flowing through the LED string to change from a first value to a second value, thereby controlling the LED string to light.

Other features and advantages will be apparent to one with skill in the art upon examination of the following drawings and detailed description.

DETAILED DESCRIPTION OF THE EMBODIMENTS

Figure 1:
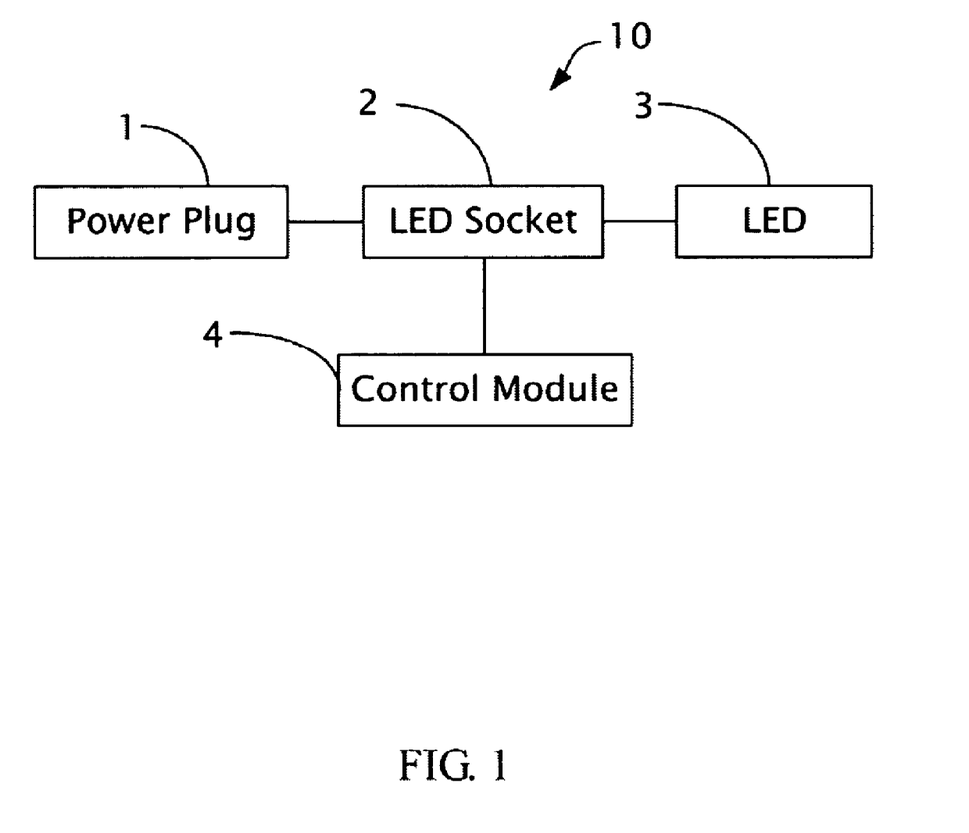
FIG. 1 is a block diagram of a light-emitting diode (LED) string in accordance with an exemplary embodiment of the present invention.

FIG. 1 is a block diagram of LED string 10 in accordance with an exemplary embodiment of the present invention. The LED string 10 includes a power plug 1, one or more LED sockets 2, one or more LEDs 3, and a control module 4. The power plug 1 connects with a power source (not shown) to power the LED string 10. The one or more LED sockets 2 electrically connects with the power plug 1. Each LED 3 is installed on and electrically connected with the one of the LED sockets 2. The control module 4 is configured for electrically connecting with one of the LED sockets 2 to control a blinking frequency and brightness of the LED string 10.

Figure 2:
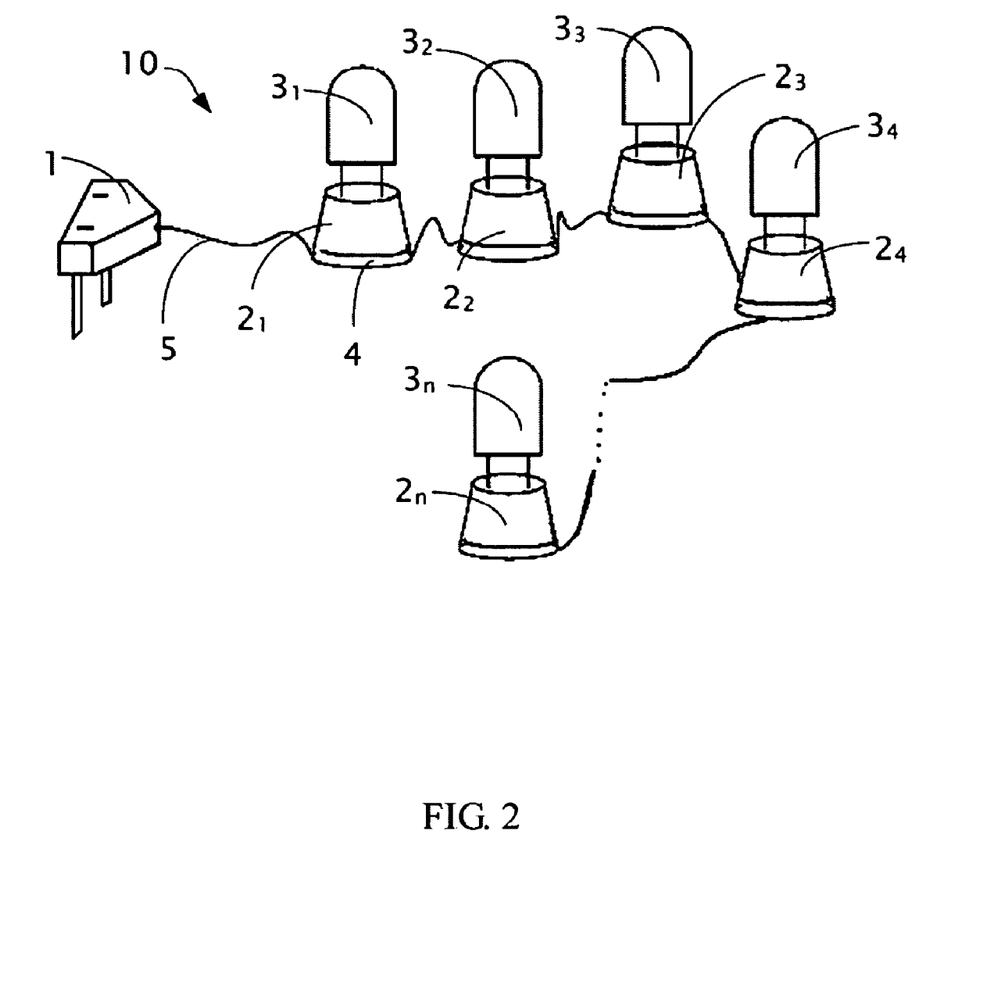
FIG. 2 is a perspective view of the LED string of FIG. 1 in accordance with another exemplary embodiment of the present invention.

FIG. 2 is a perspective view of the LED string 10. In the exemplary embodiment, the one or more LED sockets 2 are illustrated as a plurality of LED sockets $2_1, 2_2, 2_3, 2_4, \ldots, 2_n$ having the same electrical characters, and are electrically connected in series via a wire 5. The one or more LED 3 are illustrated as a plurality of LEDs $3_1, 3_2, 3_3, 3_4, \ldots, 3_n$ which are electrically installed on the LED sockets $2_1, 2_2, 2_3, 2_4, \ldots, 2_n$ respectively. In other words, LED $3_1$ is electrically installed in LED socket $2_1$, LED $3_2$ is installed in LED socket $2_2$, and so on. The power plug 1 obtains power from the power source and powers the LEDs $3_1, 3_2, 3_3, 3_4, \ldots, 3_n$ via the wire 5 to emit light.

The control module 4 can be electrically installed into any LED socket of the LED sockets $2_1, 2_2, 2_3, 2_4, \ldots, 2_n$ to control the blinking frequency and brightness of the LEDs $3_{(1-n)}$ of the LED string 10. For example, if the control module 4 and the LED $3_1$ are both installed/configured into the LED socket $2_1$, the control module 4 is connected in parallel to the LED $3_1$ and only controls the blinking frequency and brightness of the LED $3_1$. In this situation, the blinking frequency and brightness of the other LEDs $3_2, 3_3, 3_4, \ldots, 3_n$ remains the same. If the LED $3_1$ is removed from the LED socket $2_1$ and the control module 4 is left remaining in the LED socket $2_1$, the control module 4 is electrically connected in series with all the other LEDs $3_2, 3_3, 3_4, \ldots, 3_n$ and controls the blinking frequency and brightness of the other LEDs $3_{(2-n)}$. In the same manner, the control module 4 can be easily installed into any one of the LED sockets $2_i$ and controls the blinking frequency and the brightness of the LED $3_i$ of the $2_i$ or controls the blinking frequency and brightness uniformly across the other LEDs $3_n$ (n not equal i).

Figure 3:
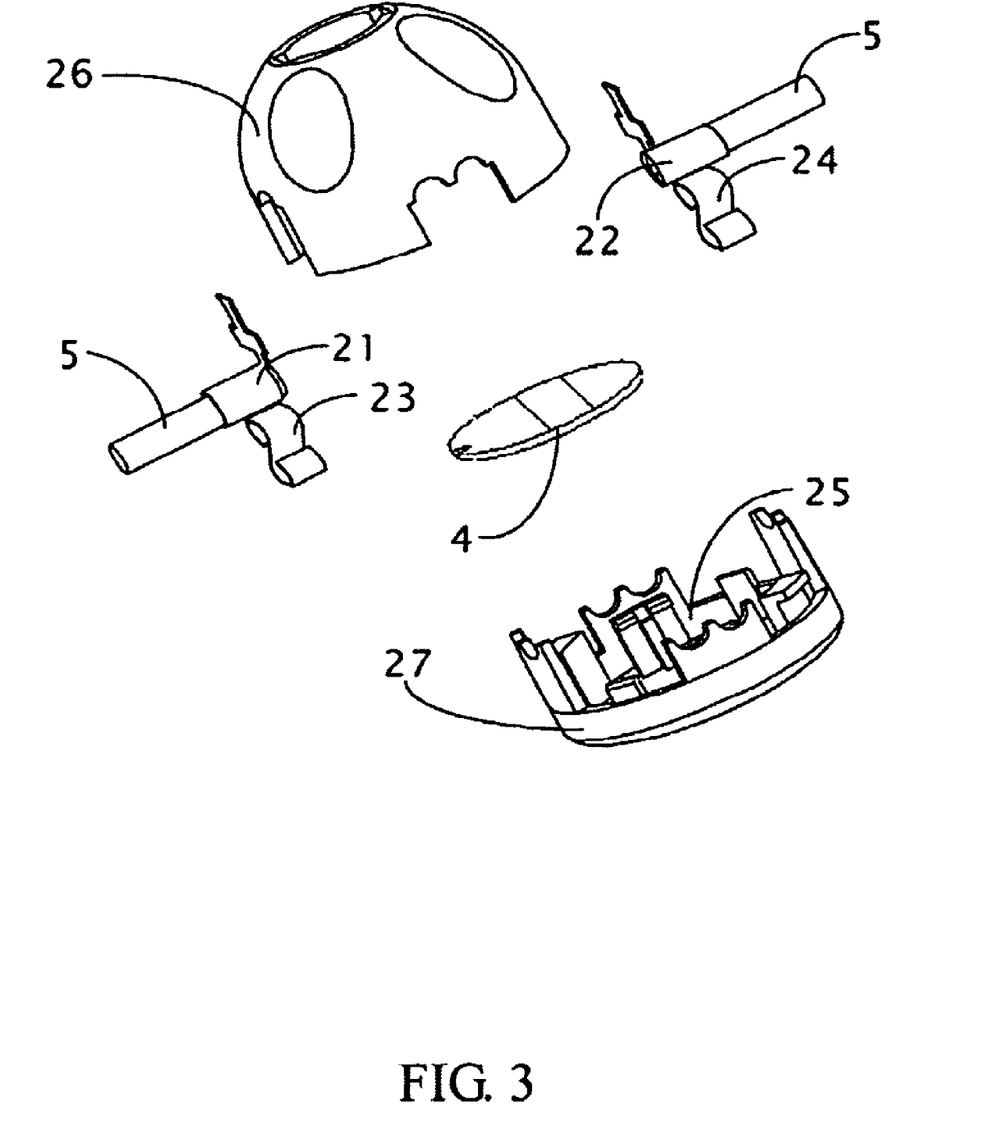
FIG. 3 is an exploded view of a LED socket of the LED string of FIG. 2.

FIG. 3 is an exploded view of one of the LED sockets 2 shown in FIG. 2. The LED socket 2 includes a positive electrode 21, a negative electrode 22, metal springs 23, 24, a housing 26, and a base 27. The positive electrode 21 and the negative electrode 22 are electrically connected with the metal springs 23, 24 respectively. The positive electrode 21 and the negative electrode 22 are both electrically connected with the wire 5. The positive electrode 21, the negative electrode 22, and the metal springs 23, 24 are integrated into the housing 26. A recess 25 is defined in the base 27 and configured for receiving the control module 4. The housing 26 is configured for engaging with the base 27.

Figure 4:
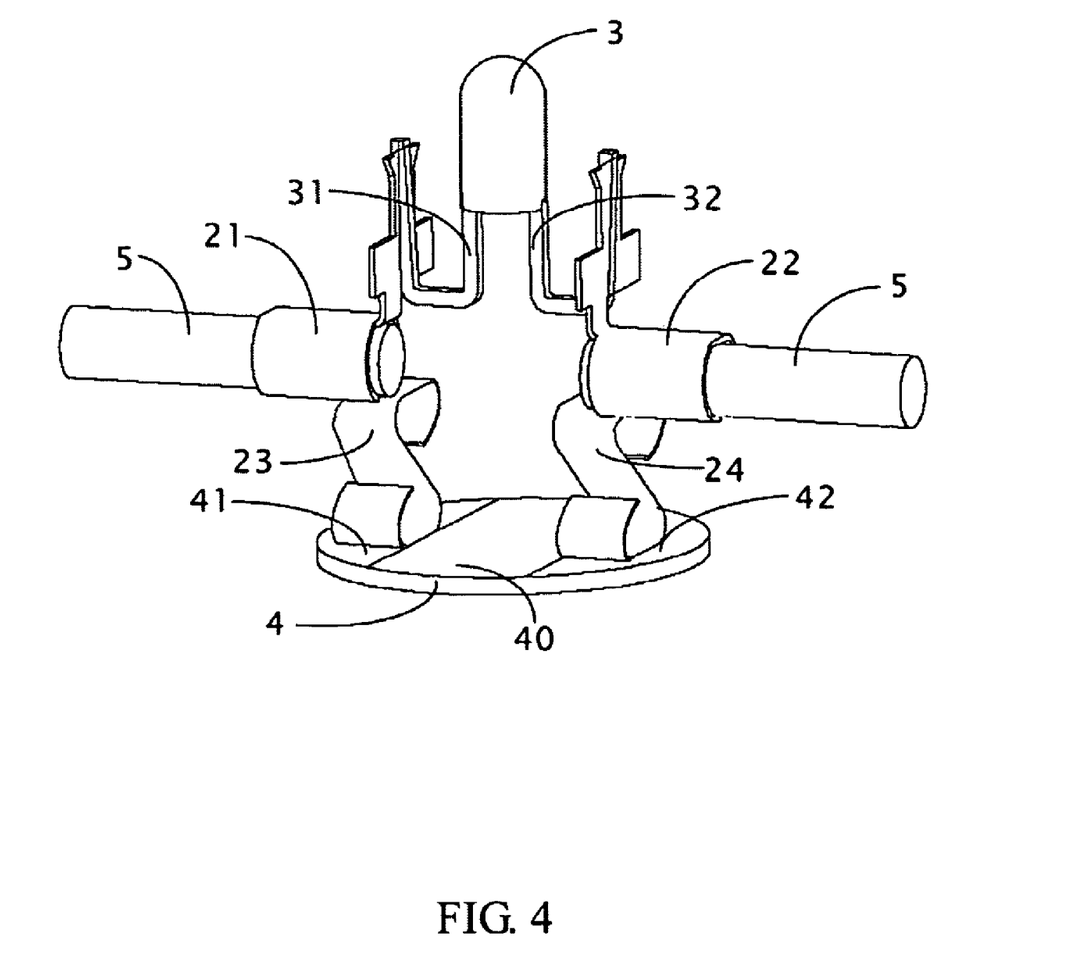
FIG. 4 is a perspective view of the LED socket of FIG. 3, the LED socket connecting with a LED and a control module.

FIG. 4 is a perspective view of the LED socket of FIG. 3, which shows an electrically connecting relationship among one of the LEDs $3_i$, one of the LED sockets of $2_i$ and the control module 4. The LED includes a positive electrode 31 and a negative electrode 32. The control module 4 includes a control circuit 40, an input terminal 41, an output terminal 42. The input terminal 41 is electrically connected with the positive electrode 31 of the LED through the metal spring 23 and the positive electrode 21 of the LED socket 2. The output terminal 42 is electrically connected with the negative electrode 32 of the LED through the metal spring 24 and the negative electrode 22 of the LED socket 2. Thus, the control module 4 is connected in parallel to the LED, thereby controlling the blinking frequency and brightness of the LED 3.

Figure 5:
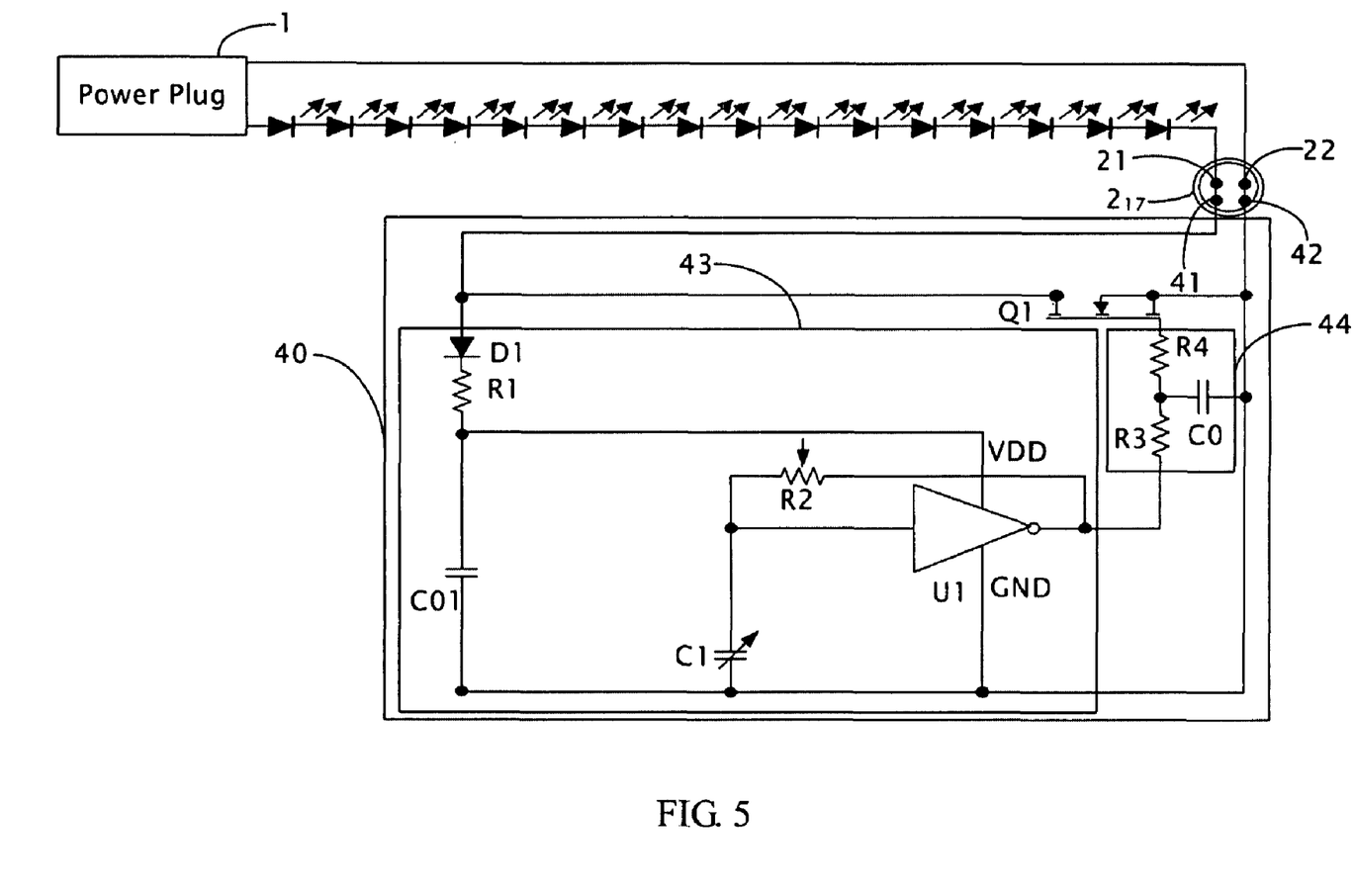
FIG. 5 is a circuit diagram of the LED string of FIG. 1, in accordance with another embodiment.

FIG. 5 is a circuit diagram of the LED string 10. In the embodiment, there are seventeen LED sockets $2_1$, $2_2$, $2_3$, ..., $2_{17}$ and sixteen LEDs $3_1$, $3_2$, $3_3$, ..., $3_{16}$. However the number of LEDs and LED sockets are not to be construed as being limited thereto, various changes in the number of LEDs and LED sockets may be made to the embodiment. The LEDs $3_1$, $3_2$, $3_3$, ..., $3_{16}$ are installed in the LED sockets $2_1$, $2_2$, $2_3$, ..., $2_{16}$ respectively. The control module 4 is installed into the LED socket $2_{17}$. The LED sockets $2_1$ through $2_{17}$ are connected in series with the power plug 1. The control circuit 40 is electrically connected between the positive electrode 21 and the negative electrode 22 of the LED socket $2_{17}$ through the metal springs 23, 24, so that the control circuit 40 is connected in series with the LEDs $3_{(1-16)}$, thereby controlling the blinking frequency and brightness of the LEDs $3_{(1-16)}$.

The control circuit 40 includes an oscillating circuit 43, a resistance component and capacitance component network (RC) circuit 44 and a field effect transistor Q1. The oscillating circuit 43 is configured for outputting a square wave signal S1. The RC circuit 44 converts the square wave S1 to a triangle wave signal S2. The field effect transistor Q1 turns on and off according to the triangle wave signal S2.

The oscillating circuit 43 includes a diode D1, a first resistance component R1 and a second resistance component R2, a first capacitance component C01, and a not gate U1. The not gate U1 includes a power supply terminal VDD, a ground terminal (GND), an input terminal, an output terminal. The diode D1, the first resistance component R1 and the first capacitance component C01 are connected in series between the input terminal 41 and the output terminal 42 of the control module 4. The VDD terminal of the not gate U1 is connected to a node provided between the first resistance component R1 and the first capacitance component C01, and the ground terminal is connected with the output terminal 42 of the control module 4. The output terminal of the not gate U1 is connected with an input terminal of the RC circuit 44. The output terminal of the not gate U1 is also connected to the input terminal of the not gate U1 via the second resistance component R2.

The oscillating circuit 43 further includes a second capacitance component C1. The second capacitance component C1 is electrically connected between the input terminal of the not gate U1 and the output terminal 42 of the control module 4. The second capacitance component C1 may have a constant capacitance, or a variable capacitance adjustable via a knob (not shown) configured on the housing 26, thereby the oscillating circuit 43 outputs a plurality of square wave signals S1 with different frequency values corresponding to capacitances of the second capacitance component C1. In the same manner, the second resistance component R2 may have a variable resistance adjustable via a second knob (not shown) configured on the housing 26, thereby the oscillating circuit 43 outputs the square wave signals S1 with different frequency values.

The RC circuit 44 includes resistors R3 and R4, and a capacitance component CO. The resistors R3 and R4 are connected in series between the output terminal of the not gate U1 and the gate electrode of the field effect transistor Q1. The capacitance component C0 is connected between the output terminal of the control module 4 and a node provided between the resistance components R3 and R4. The drain electrode and the source electrode of the field effect transistor Q1 are electrically connected with the input terminal and the output terminal of the control module 4 respectively.

When the power plug 1 is electrically connected with a power source, a voltage is supplied to the VDD terminal of the not gate U1 via the node provided between the first resistance component R1 and the first capacitance component C01 and triggers the oscillating circuit 43 to oscillate and output a square wave signal S1. The RC circuit 44 converts the square wave S1 to a triangle wave signal S2 that controls the field effect transistor Q1 to turn on and off.

Figure 6:
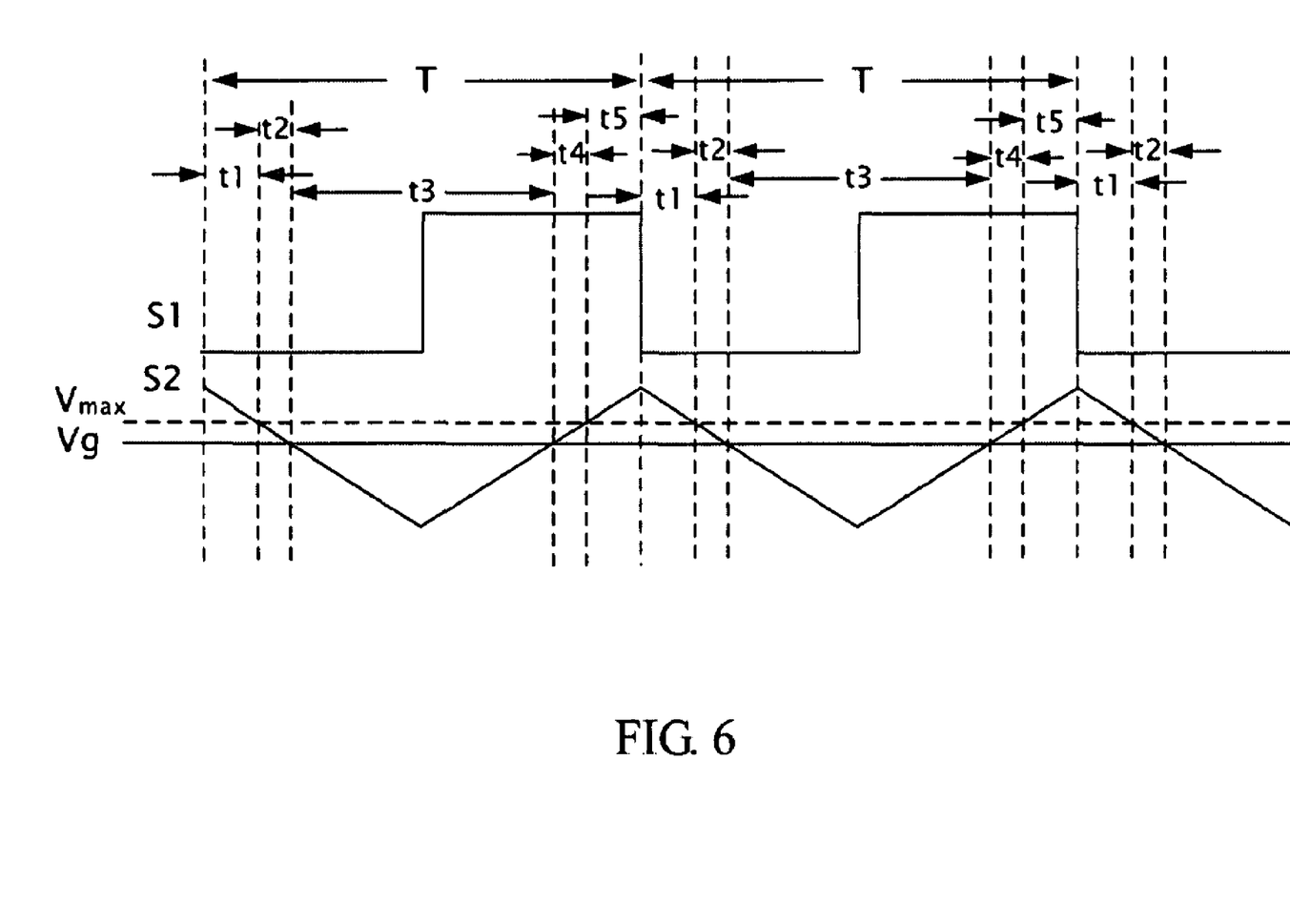
FIG. 6 illustrates a timing diagram illustrating operation of a control circuit of FIG. 5.

FIG. 6 illustrates a timing diagram depicting an operation of the control circuit 40 in FIG. 5. The field effect transistor Q1 has a cutoff voltage Vg and a saturation voltage Vmax that is larger than the cutoff voltage Vg. When the gate electrode of the field effect transistor Q1 is supplied with a voltage that is equal to or larger than the saturation voltage Vmax, the field effect transistor Q1 supplies a maximum constant current. When the gate electrode of the field effect transistor Q1 is supplied with a voltage that is less than the cutoff voltage Vg, the field effect transistor Q1 is turned off. The triangle wave S2 has a period T which includes five time intervals t1, t2, t3, t4 and t5.

During the time interval t1, the voltage of the triangle wave S2 is reduced to the saturation voltage Vmax of the field effect transistor Q1, the field effect transistor Q1 supplies the maximum constant current. Because the field effect transistor Q1 is connected in series with the LEDs $3_{(1-16)}$, the LEDs $3_{(1-16)}$ emit light with the maximum luminance.

During the time interval t2, the voltage of the triangle wave S2 changes from the saturation voltage Vmax to the cutoff voltage Vg, the current flowing through the field effect transistor Q1 is reduced from the maximum constant current to zero current gradually. As a result, the LEDs $3_{(1-16)}$ become dim and/or emits no light.

During the time interval t3, the voltage of the triangle wave S2 is less than the cutoff voltage Vg of the field effect transistor Q1, and the field effect transistor Q1 is turned off. As a result, the LEDs $3_{(1-16)}$ go out.

During the time interval t4, the voltage of the triangle wave S2 changes from the cutoff voltage Vg to the saturation voltage Vmax of the field effect transistor Q1, the current flowing through the field effect transistor is increased from the zero current to the maximum constant current. The LEDs $3_{(1-16)}$ emit light again and their brightness increases gradually.

During the time interval t5, the voltage of the triangle wave S2 is larger than the saturation voltage Vmax of the field effect transistor Q1, the field effect transistor Q1 supplies the constant maximum current continually. As a result, the LEDs $3_{(1-16)}$ emit light with the maximum luminance.

In the next period, the LEDs $3_{(1-16)}$ repeat the aforementioned change of light. In this way, the control module 4 controls the blinking frequency and brightness of the LED string 10.

Figure 7:
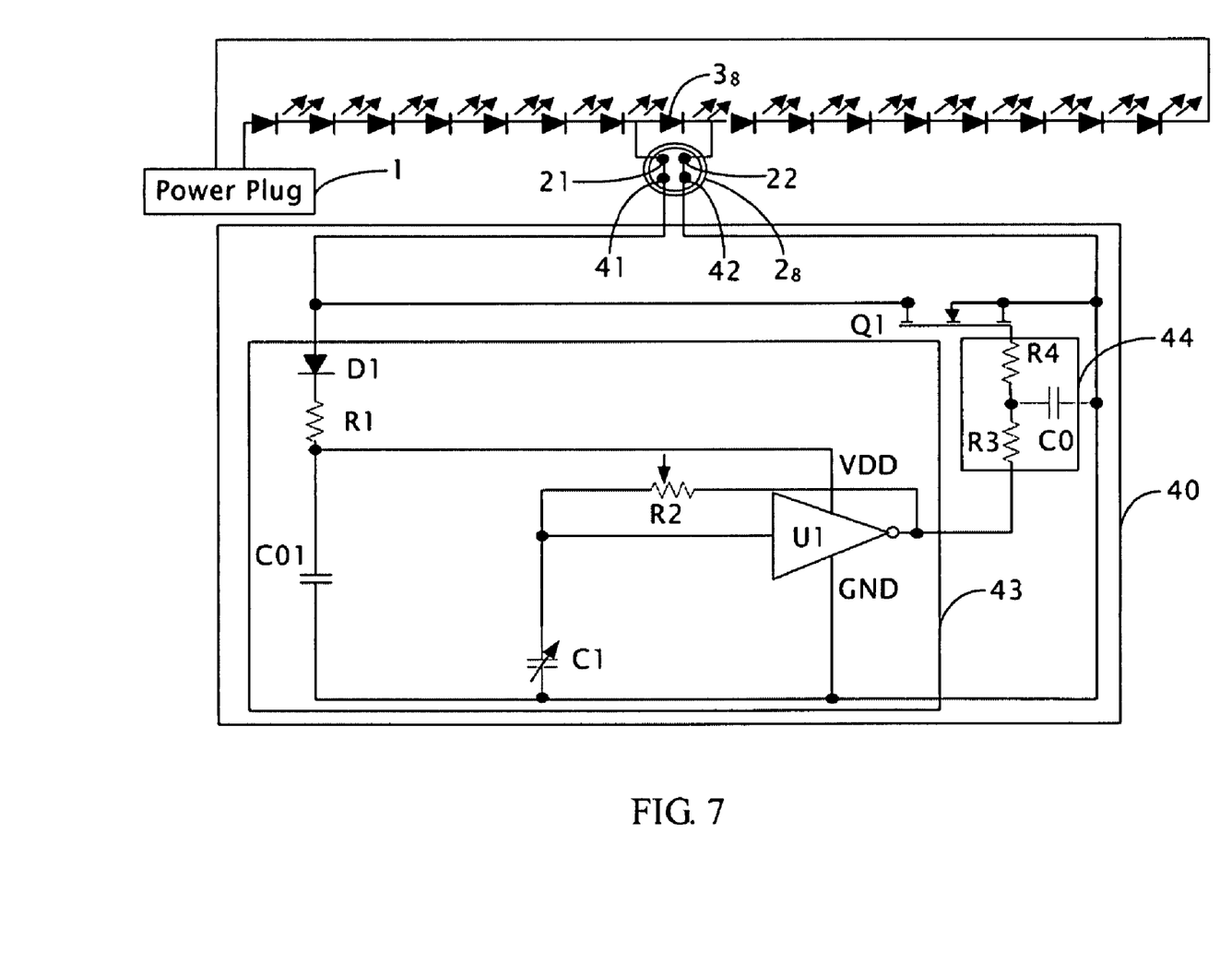
FIG. 7 is another circuit diagram of the LED string of FIG. 1, in accordance with another embodiment.

FIG. 7 is circuit diagram of the LED string 10, in accordance with another embodiment. In this circuit, the control module 4 is connected in parallel with the LED 38 of the LEDs $3_{(1-16)}$. When the power plug 1 is connected with a power resource, the oscillating circuit 43 of the control circuit 40 produces and outputs the square wave signal S1, the RC circuit 44 converts the square wave S1 to the triangle wave signal S2 to control the field effect transistor Q1 to turn on and off, thereby controlling the blinking frequency and brightness of the LED $3_8$.

Referring to FIG. 6 again, during the time interval t1, the current flowing through the field effect transistor Q1 is the maximum constant current. Because the control module 4 is connected in parallel with the LED $3_8$, the current flowing through the LED $3_8$ is zero. The LED $3_8$ does not emit light and the other LEDs light with the maximum luminance.

During the time interval t2, the current flowing through the field effect transistor Q1 is gradually reduced from the maximum constant current to the zero current, on the contrary, the current flowing through the LED $3_8$ gradually increases from zero to the maximum constant current, and the LED $3_8$ emits light and the brightness of the light increases gradually.

During the time interval t3, the field effect transistor Q1 is turned off. The current flowing through the LED $3_8$ is the maximum constant current, and all the LEDs emits light with the maximum luminance.

During the time interval t4, the current flowing through the field effect transistor Q1 is gradually increased from the zero current to the maximum constant current. On the contrary, the current flowing through the LED $3_8$ is gradually reduced from the maximum constant current to the zero current, and the LED $3_8$ becomes dim and/or emits no light.

During the time interval t5, the current flowing through the field effect transistor Q1 is the maximum constant current and the current flowing through the LED $3_8$ is zero. The LED $3_8$ does not emit light and the other LEDs light with the maximum luminance.

Although the present invention has been specifically described on the basis of a preferred embodiment and method thereof, the invention is not to be construed as being limited thereto. Various changes or modifications may be made to the embodiments without departing from the scope and spirit of the invention.

What is claimed is:

1. An LED string comprising:
   a power plug configured for connecting with a power source to power the LED string;
   one or more LED sockets configured for electrically connecting with the power plug;
   one or more LEDs configured for being installed on and electrically connecting with the one or more LED sockets; and
   a control module configured for being electrically connected with one of the one or more LED sockets;
   wherein the control module includes a control circuit, an input terminal, an output terminal, the control circuit electrically connects with one of the one or more LED sockets via the input terminal and the output terminal and controls a current flowing through the LED string to change from a first value to a second value, thereby controlling the LED string to light;
   wherein the control circuit comprises an oscillating circuit, a resistance component and capacitance component network (RC) circuit, and a field effect transistor, the oscillating circuit outputs a square wave signal, the RC circuit converts the square signal to a triangle wave signal which is used to control the field effect transistor to turn on and off, the field effect transistor comprises a drain electrode and a source electrode and a gate electrode, the drain electrode and the source electrode are correspondingly connected with the input terminal and the output terminal of the control module, and the gate electrode is connected with the RC circuit.

2. The LED string as claimed in claim 1, wherein the oscillating circuit comprises a diode, a first resistance component, a second resistance component, a first capacitance, a second capacitance, and a not gate, the not gate comprises a power supply terminal, a ground, an input terminal, and an output terminal; the diode, the first resistance component and the first capacitance component are connected in series between the input terminal and the output terminal of the control module, the power supply terminal is connected with the node provided between the first resistance component and the first capacitance component, the ground of the not gate is connected with the output terminal of the control module, the input terminal is connected with output terminal of the control module through the second capacitance component, the output terminal of the not gate is feedback to the input terminal of the not gate through the second resistance.

3. The LED string as claimed in claim 2, wherein the second resistance component has a variable resistance.

4. The LED string as claimed in claim 2, wherein the second capacitance component has a variable capacitance.

5. An LED string comprising:
   a power plug configured for connecting with a power source to power the LED string; one or more LED sockets configured for electrically connecting with the power plug;
   one or more LEDs configured for being installed on and electrically connecting with the one or more LED sockets; and
   a control module configured for being electrically connected with one of the one or more LED sockets;
   wherein when the control module and one of the one or more LEDs are both installed into one of the one or more LED sockets, the control module is connected in parallel to the one LED and only controls the blinking frequency and brightness of the one LED, and when the one LED is removed from the one LED socket and the control module is left remaining in the one LED socket, the control module is electrically connected in series with all the other LEDs and controls the blinking frequency and brightness of the other LEDs; and
   the control module configured for being electrically connected with one of the one or more LED sockets;
   wherein the control module includes a control circuit comprises an oscillating circuit, a resistance component and capacitance component network (RC) circuit, and a field effect transistor, the oscillating circuit outputs a square wave signal, the RC circuit converts the square signal to a triangle wave signal which is used to control the field effect transistor to turn on and off, the field effect transistor comprises a drain electrode and a source electrode and a gate electrode, the drain electrode and the source electrode are correspondingly connected with the input terminal and the output terminal of the control module, and the gate electrode is connected with the RC circuit.

6. The LED string as claimed in claim 5, wherein each of the one or more LED sockets comprise a positive electrode and a negative electrode, each of the one or more LEDs comprising a positive electrode and a negative electrode configured for connecting with the positive electrode and the negative electrode of each LED socket correspondingly.

7. The LED string as claimed in claim 6, wherein the positive electrode and the negative of each LED socket are further configured for connecting with an input terminal and an output terminal of the control module correspondingly.

8. The LED string as claimed in claim 5, wherein the control module comprises an oscillating circuit, a resistance component and capacitance component network (RC) circuit, and a field effect transistor, the oscillating circuit outputs a square wave signal, the RC circuit converts the square signal to a triangle wave signal which is used to control the field effect transistor to turn on and off, the field effect transistor comprises a drain electrode and a source electrode and a gate electrode, the drain electrode and the source electrode are correspondingly connected with an input terminal and an output terminal of the control module, and the gate electrode is connected with the RC circuit.

9. The LED string as claimed in claim 8, wherein the oscillating circuit comprises a diode, a first resistance component, a second resistance component, a first capacitance, a second capacitance, and a not gate, the not gate comprises a power supply terminal, a ground, an input terminal, and an output terminal; the diode, the first resistance component and the first capacitance component are connected in series between the input terminal and the output terminal of the control module, the power supply terminal is connected with the node provided between the first resistance component and the first capacitance component, the ground of the not gate is connected with the output terminal of the control module, the input terminal is connected with output terminal of the control module through the second capacitance component, the output terminal of the not gate is feedback to the input terminal of the not gate through the second resistance.

10. The LED string as claimed in claim 9, wherein the second resistance component has a variable resistance.

11. The LED string as claimed in claim 9, wherein the second capacitance component has a variable capacitance.

* * * * *